(12) United States Patent
Oka et al.

(10) Patent No.: US 12,104,068 B2
(45) Date of Patent: Oct. 1, 2024

(54) NON-AQUEOUS INK COMPOSITION, INKJET RECORDING METHOD, AND METHOD FOR MANUFACTURING PRINTED MATTER

(71) Applicant: DNP FINE CHEMICALS CO., LTD., Yokohama (JP)

(72) Inventors: Ryouhei Oka, Yokohama (JP); Yoshiya Maegawa, Yokohama (JP); Keita Yoshiyuki, Yokohama (JP); Karuna Iwasawa, Yokohama (JP); Yuka Orikasa, Yokohama (JP); Keishiro Yoshimori, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 117 days.

(21) Appl. No.: 17/913,708

(22) PCT Filed: Mar. 31, 2021

(86) PCT No.: PCT/JP2021/013971
§ 371 (c)(1),
(2) Date: Sep. 22, 2022

(87) PCT Pub. No.: WO2021/201149
PCT Pub. Date: Oct. 7, 2021

(65) Prior Publication Data
US 2023/0111531 A1    Apr. 13, 2023

(30) Foreign Application Priority Data

Mar. 31, 2020   (JP) ................................ 2020-063669

(51) Int. Cl.
| | |
|---|---|
| C09D 11/36 | (2014.01) |
| C09D 11/106 | (2014.01) |
| C09D 11/107 | (2014.01) |
| C09D 11/14 | (2006.01) |
| C09D 11/322 | (2014.01) |
| C09D 11/326 | (2014.01) |
| C09D 11/38 | (2014.01) |

(52) U.S. Cl.
CPC ............ *C09D 11/38* (2013.01); *C09D 11/106* (2013.01); *C09D 11/107* (2013.01); *C09D 11/14* (2013.01); *C09D 11/322* (2013.01); *C09D 11/326* (2013.01); *C09D 11/36* (2013.01)

(58) Field of Classification Search
CPC ..... C09D 11/38; C09D 11/106; C09D 11/107; C09D 11/14; C09D 11/322; C09D 11/326; C09D 11/36
See application file for complete search history.

(56) References Cited

U.S. PATENT DOCUMENTS

| | | |
|---|---|---|
| 2011/0009537 A1 | 1/2011 | Kotera et al. |
| 2015/0210877 A1 | 7/2015 | Grinwald et al. |
| 2017/0015849 A1 | 1/2017 | Oogaki et al. |
| 2018/0208788 A1 | 7/2018 | De Saint Romain |
| 2018/0327620 A1 | 11/2018 | Sato et al. |
| 2019/0144694 A1 | 5/2019 | Nakashima et al. |
| 2019/0177563 A1 | 6/2019 | Nakashima et al. |
| 2019/0284415 A1* | 9/2019 | Aoki ........................ B41M 5/00 |

FOREIGN PATENT DOCUMENTS

| | | |
|---|---|---|
| EP | 3053971 A1 | 8/2016 |
| JP | 2011-084680 A | 4/2011 |
| JP | 2012-126869 A | 7/2012 |
| JP | 2015-151513 A | 8/2015 |
| JP | 2015-529702 A | 10/2015 |
| JP | 2017-031272 A | 2/2017 |
| JP | 2017-186505 A | 10/2017 |
| JP | 2017-197697 A | 11/2017 |
| JP | 2018-028032 A | 2/2018 |
| JP | 2018-095688 A | 6/2018 |
| JP | 2019-006886 A | 1/2019 |
| WO | 2009/110266 A1 | 9/2009 |
| WO | 2014/009396 A2 | 1/2014 |
| WO | 2015/129744 A1 | 9/2015 |
| WO | WO-2017104477 A1 * | 6/2017 ................ B41J 2/01 |
| WO | 2018/066539 A1 | 4/2018 |

OTHER PUBLICATIONS

Apr. 25, 2023 Office Action Issued in Chinese Patent Application No. 202180024027.2.
Jun. 29, 2021 International Search Report issued in International Patent Application No. PCT/JP2021/013971.
Feb. 23, 2024 Extended European Search Report issued in European Patent Application No. 21780248.7.

* cited by examiner

*Primary Examiner* — Yaovi M Ameh
(74) *Attorney, Agent, or Firm* — Oliff PLC

(57) ABSTRACT

A non-aqueous ink composition which has superior printing performance, such as continuous discharge stability, and also has excellent storage stability and excellent coloring properties, and with which printed matter having superior durability can be obtained. A non-aqueous ink composition discharged using an inkjet method, the composition containing an organic solvent, a colorant, and a resin, where the resin contains at least one resin selected from the group consisting of acrylic resins, vinyl chloride-vinyl acetate copolymer resins, and cellulose resins, and a resin having intrinsic viscosity at 25° C. of 90 mL/g or more accounts for up to 5 mass % of the entire resin.

15 Claims, No Drawings

NON-AQUEOUS INK COMPOSITION, INKJET RECORDING METHOD, AND METHOD FOR MANUFACTURING PRINTED MATTER

TECHNICAL FIELD

The present invention relates to a non-aqueous ink composition, an inkjet recording method, and a method for manufacturing printed matter.

BACKGROUND ART

As an ink composition, a non-aqueous ink composition obtained by dissolving or dispersing various coloring materials in a mixed liquid with an organic solvent is widely used. This ink composition is applied and attached to a base material such as paper directly or via another layer by an inkjet method or the like, and the non-aqueous ink composition is dried to obtain characters and images.

For example, Patent Document 1 discloses a technology related to an inkjet ink including colored resin particles including a resin, a nonionic surface-active agent, and a non-aqueous solvent. Patent Document 1 discloses that abrasion resistance and coloring property of printed matter are excellent, and that foreign matter can be prevented from being generated in a container accommodating a dispersion product.

Thus, containing a resin in a non-aqueous ink composition has been conventionally carried out.

Patent Document 1: Japanese Unexamined Patent Application, Publication No. 2019-006886

DISCLOSURE OF THE INVENTION

Problems to be Solved by the Invention

The present invention has an object to provide a non-aqueous ink composition having excellent printing performance such as continuous ejection stability and good storage stability, and with which printed matter having good coloring property and excellent durability can be obtained.

Means for Solving the Problems

The present inventors have extensively studied in order to solve the above-mentioned problems, and as a result, have found that the above-mentioned problems can be solved when the content of a resin having a predetermined intrinsic viscosity is controlled in a non-aqueous ink composition containing a resin, and have completed the present invention.

(1) A non-aqueous ink composition including an organic solvent, a coloring material, and a resin, the non-aqueous ink composition being ejected by an inkjet method, the resin containing at least one or more resins selected from the group consisting of an acrylic-based resin, a vinyl chloride-vinyl acetate copolymer resin, and a cellulose-based resin, the resin including a resin having an intrinsic viscosity at 25° C. of 90 mL/g or more in a content of 5% by mass or less with respect to a total amount of the resin.

(2) The non-aqueous ink composition described in the above (1), in which the resin contained in the non-aqueous ink composition is contained in a content of 3.0% by mass or more and 13.0% by mass or less with respect to a total amount of the non-aqueous ink composition.

(3) The non-aqueous ink composition according to the above (1) or (2), in which the resin contains a polymeric dispersing agent.

(4) The non-aqueous ink composition according to any one of the above (1) to (3), in which the organic solvent contains at least one or more solvents selected from the group consisting of a glycol ether-based solvent, an amide-based solvent, a lactone-based solvent, and a carbonate-based solvent.

(5) An inkjet recording method, including ejecting the non-aqueous ink composition according to any one of the above (1) to (4) to a surface of a medium by an inkjet method.

(6) A method for manufacturing printed matter, the method including ejecting the non-aqueous ink composition according to any one of the above (1) to (4) to a surface of a medium by an inkjet method.

Effects of the Invention

The present invention is a non-aqueous ink composition having excellent printing performance such as continuous ejection stability and good storage stability, and with the present invention, printed matter having good coloring property and excellent durability can be obtained.

PREFERRED MODE FOR CARRYING OUT THE INVENTION

Hereinafter, a specific embodiment of the present invention will be described in detail, but the present invention is not limited to the following embodiment, and can be executed with appropriate modifications applied within the scope of the object of the present invention. Furthermore, in this specification, the term "... to ..." means "... or more" and "... or less", the term "X:Y to A:B" means a range between "X:Y" and "A:B" including "X:Y" and "A:B" themselves.

<Non-Aqueous Ink Composition>

The non-aqueous ink composition according to this embodiment is a non-aqueous ink composition including an organic solvent, a coloring material, and a resin, and being ejected by an inkjet method. Herein, the non-aqueous ink composition means an ink composition including an organic solvent, produced intentionally without containing water, unlike an aqueous ink composition including water as a main component.

The resin contains at least one or more resins selected from the group consisting of an acrylic-based resin, a vinyl chloride-vinyl acetate copolymer resin, and a cellulose-based resin. The content of the resin having an intrinsic viscosity of 90 mL/g or more at 25° C. is 5% by mass or less with respect to the total amount of the resin.

The intrinsic viscosity in the present specification can be obtained by determining the specific viscosity $[\eta_{SP}]$ (($\eta - \eta_0)/\eta_0$ ($\eta_0$: solvent viscosity, $\eta$: solution viscosity)) and the concentration C after dispersing a resin as a subject in a developing solvent and separating molecules included in the resin by a column filled with a granular gel in GPC (gel permeation chromatography), and extrapolating the concentration C to 0 (C→0) in the formula Lim ($[\eta_{SP}]/C$). Note here that the developing solvent is not particularly limited, but, for example, tetrahydrofuran can be used.

The study by the present inventors has revealed that such a resin including an acrylic-based resin, a vinyl chloride-vinyl acetate copolymer resin, and a cellulose-based resin exhibits a plurality of intrinsic viscosities, and that when the resin having intrinsic viscosity of 90 mL/g or more is included in a content of more than 5% by mass with respect to the total amount of the resin, ejection stability and the like in a case where ejection is carried out by the inkjet method is deteriorated.

A non-aqueous ink composition, in which the content of the resin having an intrinsic viscosity of 90 mL/g or more at 25° C. is controlled to 5% by mass or less with respect to the total amount of the resin, has excellent printing performance such as continuous ejection stability and good storage stability, and with which printed matter having good coloring property and excellent durability can be obtained.

Note here that the content of the resin having an intrinsic viscosity of 90 mL/g or more at 25° C. may be 5.0% by mass or less, preferably 4.0% by mass or less, more preferably 3.5% by mass or less, and the most preferably 2.5% by mass or less with respect to the total amount of the resin. The lower limit of the content of the resin having an intrinsic viscosity of 90 mL/g or more at 25° C. is not particularly limited, and, for example, even when the content is 0% by mass with respect to the total amount of the resin, the effect of the present invention is exhibited. In particular, when the content of the resin having an intrinsic viscosity of 90 mL/g or more at 25° C. is 0.5% by mass or more with respect to the total amount of the resin, a satellite drop is generated in ink drops of the non-aqueous ink composition ejected by the inkjet method, and solid filling when an image is printed is improved. From the viewpoint of the solid filling property, it is the most preferable that the content of resin having an intrinsic viscosity of 90 mL/g or more at 25° C. is 1.0% by mass or more with respect to the total amount of the resin. Note here that the solid filling is deteriorated when the content of resin having an intrinsic viscosity of 90 mL/g or more at 25° C. is more than 5.0% by mass with respect to the total amount of the resin, and unevenness is observed in a solid-printed portion when the content is 8.2% by mass or more.

Also, the content of the resin having an intrinsic viscosity at 25° C. of 100 mL/g or more is preferably controlled to a predetermined value, and the content of the resin having an intrinsic viscosity of 100 mL/g or more is preferably 3.0% by mass or less, and further preferably 2.0% by mass or less with respect to the total amount of the resin. The lower limit of the content of the resin having an intrinsic viscosity at 25° C. of 100 mL/g or more is not particularly limited, and, for example, the content may be 0% by mass with respect to the total amount of the resin, but when the content of the resin having an intrinsic viscosity at 25° C. of 100 mL/g or more is 0.2% by mass or more with respect to the total amount of the resin, a satellite drop is generated in ink drops of an non-aqueous ink composition ejected by an inkjet method, and the solid filling when an image is printed is improved. From the viewpoint of the solid filling property, it is the most preferable that the content of the resin having an intrinsic viscosity at 25° C. of 100 mL/g or more is 0.5% by mass or more with respect to the total amount of the resin.

Hereinafter, a resin, an organic solvent, a coloring material, and other additives contained in the non-aqueous ink composition according to this embodiment will be described.

[Resin]

A non-aqueous ink composition of this embodiment contains a resin. The resin contains at least one or more resins selected from the group consisting of an acrylic-based resin, a vinyl chloride-vinyl acetate copolymer resin, and a cellulose-based resin. When at least one or more resins selected from the group consisting of an acrylic-based resin, a vinyl chloride-vinyl acetate copolymer resin, and a cellulose-based resin is contained, ejection stability, water resistance, and solvent resistance can be improved. Note here that these acrylic-based resin, vinyl chloride-vinyl acetate copolymer resin, and cellulose-based resin are so-called binder resins forming a coating film, and are distinguished from a polymeric dispersing agent for dispersing a coloring material (pigment).

The acrylic-based resin is not particularly limited as long as it contains monomers constituting a (meth) acrylic ester monomer as a main component. The acrylic resin may be a homopolymer of one type of radical polymerizable monomer or a copolymer using two or more selected radical polymerizable monomers. In particular, the acrylic resin preferred as an oily ink composition according to this embodiment includes a polymer of methyl methacrylate alone, or a copolymer of methyl methacrylate and at least one or more compounds selected from the group consisting of butyl methacrylate, ethoxyethyl methacrylate, and benzyl methacrylate.

The vinyl chloride-vinyl acetate copolymer resin is a polymer of vinyl chloride monomer and vinyl acetate monomer. Examples of the vinyl chloride-vinyl acetate copolymer resin include a vinyl chloride-vinyl acetate copolymer, a vinyl chloride-vinyl acetate-maleic acid copolymer, vinyl chloride-vinyl acetate-vinyl alcohol copolymer, a vinyl chloride-vinyl acetate-hydroxyalkyl acrylate copolymer, and a mixtures thereof.

The vinyl chloride-vinyl acetate copolymer resin can be obtained by polymerizing a vinyl chloride monomer and a vinyl acetate monomer. A polymerization method may be any conventionally well-known polymerization methods. The polymerization method is preferably emulsion polymerization or suspension polymerization, and more preferably suspension polymerization.

The cellulose-based resin is a resin having a cellulose skeleton obtained by introducing a functional group biologically or chemically using cellulose as a raw material. Examples of the cellulose-based resin include cellulose acetate alkylate resins such as, for example, a cellulose acetate butyrate resin, a cellulose acetate propionate resin, and a cellulose acetate propionate butyrate resin, a cellulose acetate resin, a nitrocellulose resin, and mixtures thereof.

Furthermore, these acrylic-based resin, vinyl chloride-vinyl acetate copolymer resin, and cellulose-based resin may be used alone, but preferably used as mixtures of two types of resins, and a mixture resin obtained by mixing an acrylic-based resin and a vinyl chloride-vinyl acetate copolymer resin is more preferably used. The content ratio of the acrylic-based resin and the vinyl chloride-vinyl acetate copolymer resin can be controlled such that the requirements for color development, dryness, coating film physical properties, printability, and the like, required for the non-aqueous ink, are satisfied. When an acrylic-based resin and a vinyl chloride-vinyl acetate copolymer resin are mixed with each other, the mixing ratio is not particularly limited, and can be appropriately changed. For example, when an acrylic-based resin and a vinyl chloride-vinyl acetate copolymer resin are mixed with each other, the content of the vinyl chloride-vinyl acetate copolymer resin is preferably 80:20 to 20:80, and more preferably 70:30 to 30:70.

The contents of the acrylic-based resin, the vinyl chloride-vinyl acetate copolymer resin, and the cellulose-based resin are preferably 90% by mass or more, more preferably 95% by mass or more, and further preferably 99% by mass or more with respect to the total amount of the resin.

The weight-average molecular weight (relative molecular mass) of the resin is preferably 5000 or more, and more preferably 15000 or more. The weight-average molecular weight (relative molecular mass) is preferably 100000 or less, and more preferably 50000 or less. The relative molecular weight of the resin can be measured by usual GPC (gel permeation chromatography).

The resin contained in the non-aqueous ink composition is contained preferably in a content of 3.0% by mass or more, more preferably 5.0% by mass or more, and further preferably 5.5% by mass or more with respect to the total amount of the non-aqueous ink composition. The resin contained in the non-aqueous ink composition is contained preferably in a content of 13.0% by mass or less, more preferably 11.0% by mass or less, and further preferably 8.5% by mass or less with respect to the total amount of the non-aqueous ink composition.

Furthermore, the resin contained in the non-aqueous ink composition and having an intrinsic viscosity of 90 mL/g or more is preferably 0.35% by mass or less, more preferably 0.25% by mass or less, and further preferably 0.20% by mass or less with respect to the total amount of the non-aqueous ink composition. The resin contained in the non-aqueous ink composition and having an intrinsic viscosity of 90 mL/g or more is preferably 0% by mass or more, and more preferably 0.10% by mass or more with respect to the total amount of the non-aqueous ink composition. The lower limit of the content of the resin having an intrinsic viscosity at 25° C. of 90 mL/g or more is not particularly limited, and, for example, the content may be 0% by mass with respect to total amount of the ink composition, but when the content of the resin having an intrinsic viscosity at 25° C. of 90 mL/g or more is 0.1% by mass or more with respect to total amount of the ink composition, a satellite drop is generated in ink drops of the non-aqueous ink composition ejected by an inkjet method, and the solid filling when an image is printed is improved.

The resin contained in the non-aqueous ink composition and having an intrinsic viscosity of 100 mL/g or more is preferably 0.20% by mass or less, more preferably 0.15% by mass or less, and further preferably 0.10% by mass or less with respect to the total amount of the non-aqueous ink composition. The lower limit of the content of the resin having an intrinsic viscosity at 25° C. of 100 mL/g or more is not particularly limited, and, for example, it may be 0% by mass with respect to the total amount of the ink composition, but when the content of the resin having an intrinsic viscosity at 25° C. of 100 mL/g or more is 0.05% by mass or more with respect to total amount of the ink composition, a satellite drop is generated in ink drops of the non-aqueous ink composition ejected by the inkjet method, and the solid filling when an image is printed is improved. The content of the resin having an intrinsic viscosity of 90 mL/g or more in the total amount of the ink composition can be obtained by the product of "the content of the resin having an intrinsic viscosity of 90 mL/g or more with respect to the total amount of the resin" and "the content of the resin in the total amount of the ink composition." Note here that when the non-aqueous ink composition contains a plurality of types of resins, the content can be obtained by adding the contents of resins each having an intrinsic viscosity of 90 mL/g or more. The same is true to the content of the resin having an intrinsic viscosity of 100 mL/g or more with respect to the total amount of the ink composition.

Note here that the resin contained in the non-aqueous ink composition of this embodiment may include resins other than the acrylic-based resin, the vinyl chloride-vinyl acetate copolymer resin, and the cellulose-based resin. Examples of such resins include a polystyrene resin, a polyester resin, a vinyl chloride resin, a vinyl acetate resin, a polyethylene resin, a urethane resin, a rosin-modified resin, a phenol resin, a terpene-based resin, a polyamide resin, a vinyl toluene-a-methylstyrene copolymer, an ethylene-vinyl acetate copolymer silicone (silicon) resin, an acrylamide resin, an epoxy resin, or a copolymer resin or a mixture thereof.

Examples of resins other than the acrylic-based resin, the vinyl chloride-vinyl acetate copolymer resin, and the cellulose-based resin may be a polymeric dispersing agent in which a coloring material (pigment) contained in the non-aqueous ink composition is dispersed.

The polymeric dispersing agent has, as a main chain, a polyester-based chain, a polyacrylic-based chain, a polyurethane-based chain, a polyamine-based chain, a polycaprolactone-based chain, or the like, and has, as a side chain, a polar group such as an amino group, a carboxyl group, a sulfone group, a hydroxyl group, or the like. Examples of the polyacrylic dispersing agent include Disperbyk-2000, 2001, 2008, 2009, 2010, 2020, 2020N, 2022, 2025, 2050, 2070, 2095, 2150, 2151, 2155, 2163, 2164, BYKJET-9130, 9131, 9132, 9133, and 9151 (manufactured by BYK). Examples of the polycaprolactone-based dispersing agent include AJIS-PER PB821, PB822, and PB881 (manufactured by Ajinomoto Fine-Techno Co., Inc.). A preferable dispersing agent is a polyester dispersing agent, and examples thereof include Hinoact KF-1000, T-6000, T-7000, T-8000, T-8000E, and T-9050 (manufactured by Kawaken Fine Chemicals Co., Ltd.), Solsperse 20000, 24000, 32000, 32500, 32550, 32600, 33000, 33500, 34000, 35200, 36000, 37500, 39000, 71000, 86000, and 88000 (manufactured by Lubrizol Corporation), FlOWLEN DOPA-15BHFS, 17HF, 22, G-700, 900, NC-500, and GW-1500 (manufactured by Kyoeisha Chemical Co., Ltd.), Efka 4310, 4320, 4330, 4401, 4402, 4403N, 4570, 7411, 7477, 7700, PX4300, PX4310, PX4320, PX4330, PX4700, PX4701, PX4731, and PX4732 (manufactured by BASF), which may be used singly or as mixture thereof.

[Organic Solvent]

An organic solvent can disperse or dissolve each component contained in the non-aqueous ink composition according to this embodiment. Examples of the organic solvent include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols such as 3-methoxy-3-methyl-1-butanol, 3-methoxy-1-propanol, 1-methoxy-2-propanol, and 3-methoxy-n-butanol; amides such as 1-dimethyl formamide, dimethyl acetamide, 3-methoxypropanamide, 3-butoxypropanamide, N,N-dimethyl-3-methoxypropanamide, N,N-dibutyl-3-methoxypropanamide, N,N-dibutyl-3-butoxypropanamide, and N,N-dimethyl-3-butoxypropanamide; ketones or keto alcohols such as acetone and diacetone alcohol; ethers such as tetrahydrofuran and dioxane; oxyethylene- or oxypropylene-copolymers such as polyethylene glycol and polypropylene glycol; diols such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols such as glycerin, trimethylolethane, trimethylolpropane, and 1,2,6-hexanetriol; tetrahydric alcohols such as mesoerythritol and pentaerythritol; monoalkylethers such as ethylene glycol monomethyl (or ethyl, isopropyl, n-butyl, isobutyl, n-hexyl, 2-ethyl hexyl) ether, diethylene glycol monomethyl (or ethyl, isopropyl, n-butyl, isobutyl, n-hexyl, 2-ethyl hexyl)ether, triethylene glycol monomethyl (or ethyl, isopropyl, n-butyl, isobutyl) ether, propylene glycol monomethyl (or ethyl, isopropyl, n-butyl, isobutyl)ether, and dipropylene glycol monomethyl (or ethyl, isopropyl, n-butyl, isobutyl)ether; dialkyl ethers of polyhydric alcohols such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether, and dipropylene glycol diethyl ether; alkanolamines such as monoethanolamine, diethanolamine, triethanolamine, N-methyl ethanolamine, N-ethyl ethanolamine, N-butyl ethanolamine, N-methyl diethanolamine, N-ethyl diethanolamine, and N-butyl diethanolamine; nitrogen-containing heterocyclic compounds such as N-methyl-2-pyrrolidone, 2-pyrrolidone, and 1,3-dimethyl-2-imidazolidinone; cyclic compounds such as γ-butyrolactone, and sulfolane.

Among the above-mentioned organic solvents, at least one or more solvents selected from the group consisting of a glycol ether-based solvent, an amide-based solvent, a lactone-based solvent, and a carbonate-based solvent are preferably contained.

Examples of the glycol ether-based solvent include diethylene glycol dimethyl ether, diethylene glycol methyl ethyl ether, diethylene glycol diethyl ether, dipropylene glycol dimethyl ether, ethylene glycol butyl ether acetate, diethylene glycol methyl butyl ether, diethyl glycol dibutyl ether, triethylene glycol methyl butyl ether, tetraethylene glycol dimethyl ether, diethylene glycol ethyl ether acetate, diethylene glycol butyl ether acetate, propylene glycol methyl ether acetate, dipropylene glycol methyl ether acetate, diethylene glycol monobutyl ether, dipropylene glycol monomethyl ether, dipropylene glycol monobutyl ether, and the like.

Examples of the amide-based solvent include β-methoxypropionamide, β-butoxypropionamide, 3-methoxy-N,N-dimethylpropanamide, 3-butoxy-N,N-dimethylpropanamide, and the like.

Examples of the lactone-based solvent include γ-butyrolactone, γ-valerolactone, γ-hexalactone, γ-heptalactone, γ-octalactone, γ-nonalactone, γ-decalactone, γ-undecalactone, 5-valerolactone, 5-hexalactone, 5-heptalactone, 5-octalactone, 5-nonalactone, 5-decalactone, 5-undecalactone, ethylene carbonate, propylene carbonate, and the like.

[Coloring Material]

A coloring material contained in the non-aqueous ink composition of this embodiment is not particularly limited, and the coloring material may be a dye-based coloring material or a pigment-based coloring material, but from the viewpoint that resistance such as water resistance or light resistance of printed matter are good, a pigment-based coloring material is preferably used. The pigment that can be used in the ink composition of this embodiment is not particularly limited, and examples of the pigment include an organic pigment, an inorganic pigment, or the like, used in conventional ink compositions. One type of these pigments may be used singly, or two types or more of these pigments may be used in combination.

Specific examples of the organic pigments include an insoluble azo pigment, a soluble azo pigment, derivatives from dyes, a phthalocyanine organic pigment, a quinacridone organic pigment, a perylene organic pigment, a dioxazine organic pigment, a nickel azo pigment, an isoindolinone organic pigment, a pyranthrone organic pigment, a thioindigo organic pigment, a condensed azo organic pigment, a benzimidazolone organic pigment, a quinophthalone organic pigment, an isoindoline organic pigment, an organic solid solution pigment such as a quinacridone solid solution pigment and a perylene solid solution pigment, and carbon black as other pigments.

Examples of the color index (C.I.) numbers of the organic pigment include: C.I. pigment yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214; C.I. pigment red 5, 7, 9, 12, 48, 49, 52, 53, 57, 97, 112, 122, 123, 149, 168, 177, 180, 184, 192, 202, 206, 209, 215, 216, 217, 220, 223, 224, 226, 227, 228, 238, 240, and 254; C.I. pigment orange 16, 36, 43, 51, 55, 59, 61, 64, and 71, C.I. pigment violet 19, 23, 29, 30, 37, 40, and 50; C.I. pigment blue 15, 15:1, 15:3, 15:4, 15:6, 16, 22, 60, and 64; C.I. pigment green 7, 36, and 58; C.I. pigment brown 23, 25, and 26; C.I. pigment black 7; and the like.

Specific examples of the inorganic pigments that can be used in the ink composition of this embodiment include titanium oxide, barium sulfate, calcium carbonate, zinc oxide, barium carbonate, silica, talc, clay, synthetic mica, alumina, zinc white, lead sulfate, yellow lead, zinc yellow, bengara (red iron oxide (III)), cadmium red, ultramarine blue, navy blue, chromium oxide green, cobalt green, amber, titanium black, synthetic iron black, inorganic solid solution pigments, and the like.

In the non-aqueous ink composition of this embodiment, the average dispersed particle diameter of the pigments that can be contained is not particularly limited as long as a desired color can be produced. Although it depends on the type of pigment to be used, the number average particle diameter is preferably in the range of 5 nm or more, more preferably 20 nm or more, and further preferably 30 nm or more, in view of achieving good dispersibility and dispersion stability of the pigment and obtaining sufficient coloring power. When the number-average particle diameter is the upper limit value or less, the solvent in the non-aqueous ink composition is suppressed from volatilizing to increase the viscosity of the non-aqueous ink composition, and the ejection stability of the non-aqueous ink composition can be improved. The number-average particle diameter is preferably in the range of 300 nm or less, more preferably 200 nm or less, and further preferably 150 nm or less. When the number-average particle diameter is the above-mentioned lower limit value or less, light resistance may be deteriorated. Note here that in this embodiment, the number-average particle diameter of pigment is measured using a dense particle diameter analyzer (manufactured by Otsuka Electronics Co., Ltd., type: FPAR-1000) at a measurement temperature of 25° C.

The content of the pigment that can be used in the non-aqueous ink composition of this embodiment is not particularly limited as long as a desired image can be formed, and appropriately can be adjusted. Specifically, although it depends on types of pigment, the content is preferably 0.05% by mass or more, and more preferably 0.1% by mass or more with respect to the total amount of the non-aqueous ink composition. The content is preferably 20% by mass or less, and more preferably 10% by mass or less with respect to the total amount of the non-aqueous ink composition. When the content of the pigment is in the range of 0.05% by mass or more, or 20% by mass or less, an excellent balance between the dispersion stability and the coloring power of the pigment can be achieved.

[Surface-Active Agent]

In the non-aqueous ink composition of this embodiment, a surface-active agent may be added for the purpose of suppressing volatilization of an ink composition, preventing solidification, and redissolving when solidification occurs, in a device such as a nozzle portion and a tube, and for the purpose of reducing surface tension and improving wettability with a recording medium. Examples thereof include polyoxyalkylene alkyl ethers such as nonion P-208, P-210, P-213, E-202S, E-205S, E-215, K-204, K-220, S-207, S-215, A-10R, A-13P, NC-203, and NC-207 (manufactured by Nippon Oil & Fats Co., Ltd.), Emulgen 106, 108, 707, 709, A-90, and A-60 (manufactured by Kao Corporation), FIOWLEN G-70, D-90, and TG-740W (manufactured by Kyoeisha Chemical Co., Ltd.), Poem J-0081HV (manufactured by Riken Vitamin Co., Ltd.), Adecatol NP-620, NP-650, NP-660, NP-675, NP-683, NP-686, Adecacol CS-141E, and TS-230E (manufactured by Adeca Co., Ltd.), and the like, Sorgen 30V, 40, TW-20, and TW-80, Neugen CX-100 (manufactured by Dai-ichi Kogyo Seiyaku Co., Ltd.), and the like; as the fluorine-based surface-active agent, a fluorine-modified polymer is preferably used, and specific examples thereof include BYK-340 (manufactured by BYK Chemie Japan), and the like; as the silicone-based surface-active agent, polyester modified silicon and polyether modified silicon are preferably used, and specific examples thereof include BYK-347, 348, BYK-UV3500, 3510, 3530, and 3570 (all manufactured by BYK Chemie Japan); specific examples of an acetylene glycol-based surface-active agent include Surfinol (registered trademark) 82, 104, 465, 485, TG (all manufactured by Air Products Japan), Orfin (registered trademark) STG, E 1010 (all manufactured by Nisshin Chemical Co., Ltd), and the like.

The surface-active agent is not particularly limited to the above, and any of anionic, cationic, amphoteric, or nonionic surface-active agents can be used, and can be appropriately selected according to the addition purpose. Also, further different components may be used as necessary.

[Medium]

As a medium that can be used in the non-aqueous ink composition of this embodiment, media having a surface composition mainly made of resin are preferably used. As the resin, polyvinyl chloride-based polymer, and acryl, PET, polycarbonate, PE, PP, and the like, are used. In particular, application to media having a surface made of hard or soft polyvinyl chloride-based polymer is preferable. Examples of the media having a surface made of a polyvinyl chloride polymer include a polyvinyl chloride base material (film or sheet), and the like.

[Inkjet Recording Method]

An inkjet recording method using a non-aqueous ink composition of this embodiment is an inkjet recording method for ejecting a non-aqueous ink composition by an inkjet method so as to be recorded on the medium. Preferably, recording is carried out using an inkjet recording device equipped with a cleaning system for an inkjet head. Since the non-aqueous ink composition of this embodiment has good ejection stability, drying property, and blocking resistance of the printed matter, productivity of printed matter using the inkjet recording method can be improved.

[Method for Manufacturing Printed Matter]

Printed matter can be manufactured using the non-aqueous ink composition of this embodiment. The method for manufacturing printed matter can obtain high quality printed matter having good coloring property and excellent durability by using the non-aqueous ink composition of this embodiment.

EXAMPLES

Hereinafter, the present invention will be described in more detail by way of Examples, but the present invention is not limited in any way by these descriptions.

1. Production of Resin (1) Acrylic-Based Resin

A mixture of 150 g of methyl methacrylate, 50 g of butyl methacrylate, and a predetermined amount of t-butylperoxy-2-ethyl hexanoate (polymerization initiator) was added dropwise over 1.5 hours to 300 g of diethylene glycol diethyl ether kept at 100° C. After completion of the dropping, the mixture was allowed to react at 100° C. for 2 hours, and then cooled to obtain a colorless and transparent polymer solution of methyl methacrylate (solid content: 39.5%). At this time, the amount of t-butylperoxy-2-ethyl-hexanoate as the polymerization initiator was changed so as to control the polymerization average molecular weight of methyl methacrylate (acrylic-based resin) to 15000 to 120000 (The mass of the polymerization initiator used at this time is shown in Table 1 below. In Table 1, it is described as "initiator amount".).

(2) Vinyl Chloride-Vinyl Acetate Copolymer Resin

After nitrogen substitution, 100 parts of deionized water, 40 parts of methanol, 32 parts of vinyl chloride, 5 parts of vinyl acetate, 0.2 parts of glycidyl methacrylate, 3.55 parts of hydroxypropyl acrylate, 0.1 parts of hydroxypropyl methylcellulose (suspending agent), 0.026 parts of di-2-ethylhexyl peroxydicarbonate (polymerization initiator), and predetermined amount of di-3,5,5-trimethylhexanol peroxide (polymerization initiator) were charged into an autoclave equipped with a stirring device, and the mixture was stirred under a nitrogen gas atmosphere while the temperature was raised to 63° C., and immediately after the temperature reached 63° C., 48 parts of vinyl chloride for 6 hours and a mixture of 0.6 parts of glycidyl methacrylate and 10.65 parts of hydroxypropyl acrylate for 5.4 hours were continuously pressed into the autoclave to perform a copolymerization reaction. At the time point at which the internal pressure of the autoclave was 0.3 MPa, the residual pressure was released, and cooled, and the resin slurry was taken out, filtered, and dried to obtain a vinyl chloride-based copolymer resin. At this time, the amount of di-3,5,5-trimethylhexanol peroxide as the polymerization initiator was changed to control the polymerization average molecular weight of the vinyl chloride-vinyl acetate copolymer resin to 40000 to 75000 (The mass of the polymerization initiator used at this time is shown in Table 1 below. In Table 1, it is described as "initiator amount".).

(3) Cellulose-Based Resin

Commercially available cellulose-based resins (CAB551-0.01 and CAB553-0.4 manufactured by EASTMAN CHEMICAL) were used.

Table 1 shows the weight-average molecular weight (relative molecular mass) of each resin (a polyester-based polymeric dispersing agent, an acrylic-based resin, a vinyl chloride-vinyl acetate copolymer resin, and a cellulose-based resin), and the rate of resins having an intrinsic viscosity of 90 mL/g or more at 25° C. and 100 mL/g or more at 25° C. Note here that the weight-average molecular weight (relative molecular mass) was measured by GPC (gel permeation chromatography). Furthermore, in the rate of the resin having an intrinsic viscosity of 90 mL/g or more (100 mL/g or more), the intrinsic viscosity was obtained by using Shimadzu Corporation SEC (GPC) system to which a viscosity detector (ViscoStarlll manufactured by WYATT) and refractive index detector (Optilab T-rEX manufactured by WYATT) were connected, and using tetrahydrofuran as a developing solvent. Firstly, in the Shimadzu Corporation SEC (GPC) system, a sample was allowed to pass through a column that had been warmed at 40° C., then specific viscosity [$\eta_{SP}$] of the passing product that had been cooled to 25° C. was obtained by the viscosity detector, the concentration C was obtained by the refractive index detector, and then, the intrinsic viscosity was determined by extrapolating the concentration C to 0 in Lim ([$\eta_{SP}$]/C).

mode (360×360 dpi) using oily ink compositions of Examples and Comparative Examples, and the fine lines were visually checked and evaluated (in the tables, described as "ejection stability").

(Evaluation Criteria)
- ○ (good): Fine lines are reproduced properly.
- Δ (fair): Bending is slightly observed.
- x (Poor): Landing position is displaced, and bending is observed.

<Solid Filling Check Test>

The non-aqueous ink compositions of Examples and Comparative Examples were evaluated for solid filling. Specifically, printing was carried out by an inkjet printer

TABLE 1

| | | Weight-average molecular weight (Relative molecular mass) | Product number | Initiator amount (g) | 90 mL/g or more | 100 mL/g or more |
|---|---|---|---|---|---|---|
| Polyester-based polymeric dispersing agent | | — | — | | 0.0 | 0.0 |
| Acrylic-based resin | Acrylic-based resin 1 | Mw = 15000 | — | 3.30 | 0.0 | 0.0 |
| | Acrylic-based resin 2 | Mw = 30000 | — | 1.20 | 0.0 | 0.0 |
| | Acrylic-based resin 3 | Mw = 55000 | — | 0.40 | 0.1 | 0.0 |
| | Acrylic-based resin 4 | Mw = 80000 | — | 0.20 | 2.2 | 0.9 |
| | Acrylic-based resin 5 | Mw = 105000 | — | 0.10 | 8.1 | 3.0 |
| | Acrylic-based resin 6 | Mw = 120000 | — | 0.09 | 10.7 | 5.7 |
| Vinyl chloride-vinyl acetate copolymer resin | Vinyl chloride-vinyl acetate copolymer resin 1 | Mw = 40000 | — | 0.58 | 0.3 | 0.0 |
| | Vinyl chloride-vinyl acetate copolymer resin 2 | Mw = 50000 | — | 0.37 | 1.4 | 0.5 |
| | Vinyl-chloride vinyl acetate copolymer resin 3 | Mw = 60000 | — | 0.25 | 3.8 | 1.4 |
| | Vinyl chloride-vinyl acetate copolymer resin 4 | Mw = 75000 | — | 0.14 | 8.2 | 4.5 |
| Cellulose-based resin | Cellulose-based resin 1 | — | CAB551-0.01 | — | 4.9 | 3.1 |
| | Cellulose-based resin 2 | — | CAB553-0.4 | — | 29.0 | 24.0 |

2. Production 1 of Non-Aqueous Ink Composition

Non-aqueous ink compositions were produced such that the composition ratios (parts by mass) were as shown in Tables 2 and 3. Specifically, a non-aqueous ink composition was prepared by dispersing each component with zirconia beads using a paint shaker.

Note here that in Tables 2 and 3, the number in the parenthesis on each resin means the content of a resin having an intrinsic viscosity of 90 mL/g or more with respect to the total amount of the resin. Furthermore, as the solvent, a mixed solvent (a solvent including a glycol ether-based solvent and a lactone-based solvent) including 80% by mass of diethylene glycol diethyl ether, 10% by mass of methyl ethyl diglycol, and 10% by mass of gamma butyrolactone was used.

3. Evaluation 1 of Non-Aqueous Ink Composition

<Ejection Stability Test>

The non-aqueous ink compositions of Examples and Comparative Examples were evaluated for ejection stability. Specifically, fine lines were printed on the recording medium by an inkjet printer in a bidirectional high-speed printing using the non-aqueous ink compositions of Examples and Comparative Examples, and the filling (white spot) of the solid printed portion was observed (in the tables, described as "solid filling").

(Evaluation Criteria)
- ○ (good): Printing unevenness and white spot were not observed, a solid portion was filled with ink sufficiently (dot diameter was sufficiently expanded)
- Δ (fair): Unevenness was slightly observed, but a solid portion was filled.
- x (poor): Filling of a solid portion was insufficient, and unevenness was observed.

<Intermittent Ejection Property Test>

The non-aqueous ink compositions of Examples and Comparative Examples were evaluated for intermittent ejection property. Specifically, intermittent printing was carried out on the above-mentioned recording medium by an inkjet printer, using non-aqueous ink compositions of Examples and Comparative Examples, over a long period at ordinary temperature, the presence or absence of missing dots, flight bending, and ink splashes were observed, and the number of occurrences was counted and evaluated (in the tables, described as "intermittent ejection property").
(Evaluation Criteria)
- ○ (good): The number of occurrences of dot missing, flight bending, or ink splash in 24-hour test period was less than 10.
- Δ (fair): The number of occurrences of dot missing, flight bending, and ink splash in 24-hour test period was 10 or more and less than 20.
- x (poor): The number of occurrences of dot missing, flight bending, and ink splash in 24-hour test period was 20 or more.

<Coating Film Abrasion Resistance Test>

The non-aqueous ink compositions of Examples and Comparative Examples were evaluated for coating film abrasion resistance. Specifically, printed matter (solid printing) was produced by an inkjet printer using non-aqueous ink compositions of Examples and Comparative Examples, and a printed surface of the printed matter was rubbed with a test cloth piece at a load of 200 g 50 times in a reciprocating manner, and the abrasion resistance was evaluated in a visual observation (in the tables, described as "coating film abrasion resistance").

(Evaluation Criteria)
- ○ (good): Ink film was not peeled.
- Δ (fair): Ink film was slightly peeled.
- x (poor): Ink film was peeled and base material was exposed.

<OD Value (Coloring Property) Test>

The non-aqueous ink compositions of Examples and Comparative Examples were evaluated for OD value (coloring property). Specifically, printed matter (solid printing) was produced using non-aqueous ink compositions of Examples and Comparative Examples by an inkjet printer, and an OD value was measured (in the tables, described as "OD value (coloring property)"). The OD value was obtained by measuring the reflection concentration using X-Rite eXact (manufactured by X-Rite Inc.) under the conditions of the viewing angle of 2°, a measuring range of 4 mmφ, and a D65 light source.

(Evaluation Criteria)
- ○ (good): OD value was 2.5 or more.
- Δ (fair): OD value was 2.0 or more and less than 2.5.
- x (poor): OD value was less than 2.0.

TABLE 2

| | | | Example-1 | Example-2 | Example-3 | Example-4 | Comparative Example-1 | Comparative Example-2 |
|---|---|---|---|---|---|---|---|---|
| Pigment | Carbon black | | 4.0 | 4.0 | 4.0 | 4.0 | 4.0 | 4.0 |
| Resin | Polyester-based polymeric dispersing agent | | 2.0 | 2.0 | 2.0 | 2.0 | 2.0 | 2.0 |
| | Acrylic resin | Acrylic-based resin 1(0.0) | 10.0 | | | | | |
| | | Acrylic-based resin 2(0.0) | | 7.5 | | | | |
| | | Acrylic-based resin 3(0.1) | | | 6.5 | | | |
| | | Acrylic-based resin 4(2.2) | | | | 5.2 | | |
| | | Acrylic-based resin 5(8.1) | | | | | 4.5 | |
| | | Acrylic-based resin 6(10.7) | | | | | | 3.9 |
| | Vinyl chloride-vinyl acetate resin copolymer | Vinyl chloride-vinyl acetate copolymer resin 1(0.3) | | | | | | |
| | | Vinyl chloride-vinyl acetate copolymer resin 2(1.4) | | | | | | |
| | | Vinyl chloride-vinyl acetate copolymer resin 3(3.8) | | | | | | |
| | | Vinyl chloride-vinyl acetate copolymer resin 4(8.2) | | | | | | |
| | Cellulose based resin | Cellulose-based resin 1(4.9) | | | | | | |
| | | Cellulose-based resin 2(29.0) | | | | | | |
| | Total resin content | | 12.0 | 9.5 | 8.5 | 7.2 | 6.5 | 5.9 |
| Solvent | | | Balance | | | | | |
| Total | | | 100.0 | 100.0 | 100.0 | 100.0 | 100.0 | 100.0 |
| Intrinsic viscosity(%) (With respect to total amount of resin) | 90 mL/g or more | | 0.0 | 0.0 | 0.1 | 2.2 | 8.1 | 10.7 |
| | 100 mL/g or more | | 0.0 | 0.0 | 0.0 | 0.9 | 3.0 | 5.7 |
| Evaluation | Ejection property | Ejection stability | ○ | ○ | ○ | ○ | X | X |
| | Image quality | Solid filling | Δ | Δ | Δ | ○ | Δ | X |
| | Liquid physical property | Intermittent ejection property | ○ | ○ | ○ | ○ | Δ | Δ |
| | Coating film physical property | Coating film abrasion resistance | Δ | ○ | ○ | ○ | ○ | ○ |
| | Quality | OD value (coloring) | ○ | ○ | ○ | ○ | X | X |

TABLE 2-continued

|  |  |  | Example-5 | Example-6 | Example-7 | Comparative Example-3 | Example-8 | Example-9 |
|---|---|---|---|---|---|---|---|---|
| Pigment | Carbon black |  | 4.0 | 4.0 | 4.0 | 4.0 | 4.0 | 4.0 |
| Resin | Polyester-based polymeric dispersing agent |  | 2.0 | 2.0 | 2.0 | 2.0 | 2.0 | 2.0 |
|  | Acrylic resin | Acrylic-based resin 1(0.0) |  |  |  |  |  |  |
|  |  | Acrylic-based resin 2(0.0) | 4.5 | 2.6 | 4.2 | 2.4 |  |  |
|  |  | Acrylic-based resin 3(0.1) |  |  |  |  |  |  |
|  |  | Acrylic-based resin 4(2.2) |  |  |  |  |  |  |
|  |  | Acrylic-based resin 5(8.1) | 1.5 | 2.6 |  |  |  |  |
|  |  | Acrylic-based resin 6(10.7) |  |  | 1.4 | 2.4 |  |  |
|  | Vinyl chloride-vinyl acetate resin copolymer | Vinyl chloride-vinyl acetate copolymer resin 1(0.3) |  |  |  |  | 6.2 |  |
|  |  | Vinyl chloride-vinyl acetate copolymer resin 2(1.4) |  |  |  |  |  | 5.6 |
|  |  | Vinyl chloride-vinyl acetate copolymer resin 3(3.8) |  |  |  |  |  |  |
|  |  | Vinyl chloride-vinyl acetate copolymer resin 4(8.2) |  |  |  |  |  |  |
|  | Cellulose based resin | Cellulose-based resin 1(4.9) |  |  |  |  |  |  |
|  |  | Cellulose-based resin 2(29.0) |  |  |  |  |  |  |
|  | Total resin content |  | 8.0 | 7.2 | 7.6 | 6.8 | 8.2 | 7.6 |
| Solvent |  |  | Balance | | | | | |
| Total |  |  | 100.0 | 100.0 | 100.0 | 100.0 | 100.0 | 100.0 |
| Intrinsic viscosity(%) (With respect to total amount of resin) | 90 mL/g or more |  | 2.0 | 4.1 | 2.7 | 5.4 | 0.3 | 1.4 |
|  | 100 mL/g or more |  | 1.4 | 2.9 | 1.4 | 2.9 | 0.0 | 0.5 |
| Evaluation | Ejection property | Ejection stability | ○ | Δ | ○ | X | ○ | ○ |
|  | Image quality | Solid filling | ○ | ○ | ○ | Δ | Δ | ○ |
|  | Liquid physical property | Intermittent ejection property | ○ | Δ | ○ | Δ | ○ | ○ |
|  | Coating film physical property | Coating film abrasion resistance | ○ | ○ | ○ | ○ | ○ | ○ |
|  | Quality | OD value (coloring) | ○ | ○ | ○ | Δ | ○ | ○ |

TABLE 3

|  |  |  | Example-10 | Comparative Exampl-4 | Example-11 | Example-12 | Example-13 | Comparative Exampl-5 |
|---|---|---|---|---|---|---|---|---|
| Pigment | Carbon black |  | 4.0 | 4.0 | 4.0 | 4.0 | 4.0 | 4.0 |
| Resin | Polyester-based polymeric dispersing agent |  | 2.0 | 2.0 | 2.0 | 2.0 | 2.0 | 2.0 |
|  | Acrylic resin | Acrylic-based resin 1(0.0) |  |  | 7.2 | 0.5 | 4.5 | 1.4 |
|  |  | Acrylic-based resin 2(0.0) |  |  |  |  |  |  |
|  |  | Acrylic-based resin 3(0.1) |  |  |  |  |  |  |
|  |  | Acrylic-based resin 4(2.2) |  |  |  |  |  |  |
|  |  | Acrylic-based resin 5(8.1) |  |  |  |  |  |  |
|  |  | Acrylic-based resin 6(10.7) |  |  |  |  |  |  |

TABLE 3-continued

| | | | | | | | | |
|---|---|---|---|---|---|---|---|---|
| | Vinyl chloride-vinyl acetate resin copolymer | Vinyl chloride-vinyl acetate copolymer resin 1(0.3) | | | | | | |
| | | Vinyl chloride-vinyl acetate copolymer resin 2(1.4) | | | | | | |
| | | Vinyl chloride-vinyl acetate copolymer resin 3(3.8) | 4.8 | | 0.8 | 4.5 | | |
| | | Vinyl chloride-vinyl acetate copolymer resin 4(8.2) | | 4.2 | | | 1.9 | 3.3 |
| | Cellulose based resin | Cellulose-based resin 1(4.9) | | | | | | |
| | | Cellulose-based resin 2(29.0) | | | | | | |
| | Total resin content | | 6.8 | 6.2 | 10.0 | 7.0 | 8.4 | 6.7 |
| Solvent | | | Balance | | | | | |
| Total | | | 100.0 | 100.0 | 100.0 | 100.0 | 100.0 | 100.0 |
| Intrinsic visocity(%) (With respect to total amount of resin) | | 90 mL/g or more | 3.8 | 8.2 | 0.4 | 3.4 | 2.5 | 5.7 |
| | | 100 mL/g or more | 1.4 | 4.5 | 0.1 | 1.3 | 1.4 | 3.2 |
| Evaluation | Ejection property | Ejection stability | Δ | X | ○ | ○ | ○ | X |
| | Image quality | Solid filling | ○ | X | Δ | ○ | ○ | Δ |
| | Liquid physical property | Intermittent ejection property | Δ | Δ | ○ | Δ | ○ | Δ |
| | Coating film physical property | Coating film abrasion resistance | ○ | ○ | ○ | ○ | ○ | ○ |
| | Quality | OD value (coloring) | ○ | Δ | ○ | ○ | Δ | X |

| | | | Example-14 | Comparative Exampl-6 | Comparative Exampl-7 | Example-15 | Example-16 |
|---|---|---|---|---|---|---|---|
| Pigment | Carbon black | | 4.0 | 4.0 | 4.0 | 4.0 | 4.0 |
| Resin | Polyester-based polymeric dispersing agent | | 2.0 | 2.0 | 2.0 | 2.0 | 2.0 |
| | Acrylic resin | Acrylic-based resin 1(0.0) | | | | | |
| | | Acrylic-based resin 2(0.0) | | | | 2.2 | 3.1 |
| | | Acrylic-based resin 3(0.1) | | | | | |
| | | Acrylic-based resin 4(2.2) | | | | | |
| | | Acrylic-based resin 5(8.1) | 0.4 | 3.4 | | | |
| | | Acrylic-based resin 6(10.7) | | | | | |
| | Vinyl chloride-vinyl acetate resin copolymer | Vinyl chloride-vinyl acetate copolymer resin 1(0.3) | | | | | |
| | | Vinyl chloride-vinyl acetate copolymer resin 2(1.4) | | | | | |
| | | Vinyl chloride-vinyl acetate copolymer resin 3(3.8) | 3.6 | 1.5 | | 1.1 | 1.2 |
| | | Vinyl chloride-vinyl acetate copolymer resin 4(8.2) | | | | | |
| | Cellulose based resin | Cellulose-based resin 1(4.9) | | | | 1.1 | |
| | | Cellulose-based resin 2(29.0) | | | 1.5 | | 0.6 |
| | Total resin content | | 6.0 | 6.9 | 3.5 | 6.4 | 7.0 |
| Solvent | | | Balance | | | | |
| Total | | | 100.0 | 100.0 | 100.0 | 100.0 | 100.0 |
| Intrinsic visocity(%) (With respect to total amount of resin) | | 90 mL/g or more | 4.2 | 6.8 | 29.0 | 2.2 | 4.6 |
| | | 100 mL/g or more | 1.6 | 2.5 | 24.0 | 1.1 | 3.4 |
| Evaluation | Ejection property | Ejection stability | Δ | X | X | ○ | Δ |
| | Image quality | Solid filling | ○ | Δ | X | ○ | ○ |
| | Liquid physical property | Intermittent ejection property | Δ | X | ○ | ○ | Δ |
| | Coating film physical property | Coating film abrasion resistance | ○ | ○ | Δ | Δ | ○ |
| | Quality | OD value (coloring) | ○ | Δ | X | ○ | ○ |

From Tables 2 and 3, it is shown that the non-aqueous ink composition including a resin having an intrinsic viscosity of 90 mL/g or more at 25° C. of 5% by mass or less with respect to the total amount of the resin has excellent printing performance such as continuous ejection stability, and has good storage stability, and with which printed matter having good coloring property and excellent durability can be obtained.

Note here that in Examples 4 to 7, 9, 10, and 12 to 16 in which the content of resin having an intrinsic viscosity of 90 mL/g or more at 25° C. was 1.0% by mass or more and 5.0% by mass or less with respect to the total amount of the resin, solid filling was good as compared with the other Examples and Comparative Examples. On the other hand, in Comparative examples 2, 4, and 7 in which the content of resin having 90 mL/g or more was 8.2% by mass or more with respect to the total amount of the resin, unevenness was observed in the solid printing portion.

4. Production 2 of Non-Aqueous Ink Composition

Non-aqueous ink compositions of Examples 17 to 33 and Comparative Examples 8 to 11 were produced such that the composition ratios were those in Table 4 (parts by mass). Specifically, a non-aqueous ink composition was prepared by dispersing each component with zirconia beads using a paint shaker.

Note here that in Table 4, the number in the parenthesis on each resin means the content of a resin having an intrinsic viscosity of 90 mL/g or more with respect to the total amount of the resin content. Furthermore, for solvents contained in the non-aqueous ink compositions of Examples 17 to 27 and Comparative Examples 8 to 10, a mixed solvent of 80% by mass of diethylene glycol diethyl ether, 10 mass of methyl ethyl diglycol, and 10% by mass of gamma butyrolactone was used. Then, for the solvent contained in the non-aqueous ink composition of Examples 28 to 33 and Comparative Example 11, a mixed solvent (a solvent including a glycol ether-based solvent and an amide-based solvent) including 80% by mass of diethylene glycol diethyl ether, 10 mass of methyl ethyl diglycol, 10% by mass of 3-methoxy-N,N-dimethyl propanamide, and 10% by mass of gamma butyrolactone was used.

4. Evaluation 2 of Non-Aqueous Ink Composition

The non-aqueous ink compositions of Examples 17 to 33 and Comparative Examples 8 to 11 were examined in the same manner as in the evaluation 1 of the non-aqueous ink composition mentioned above. Note here that the OD value (coloring property) test of the non-aqueous ink composition of Examples and Comparative Examples containing pigments being different from carbon black were carried out under the following evaluation criteria.

(Evaluation Criteria)
- ○ (good): OD value was 1.6 or more.
- Δ (fair): OD value was 1.2 or more and less than 1.6.
- x (poor): OD value was less than 1.2.

TABLE 4

| | | Example 17 | Comparative Example 8 | Example 18 | Example 19 | Example 20 | Comparative Example 9 | Example 21 |
|---|---|---|---|---|---|---|---|---|
| Pigment | Carbon black | | | | | | | |
| | Cyan pigment(P.B. 15:4) | 3.0 | 3.0 | | | | | |
| | Magenta pigment(P.R.122) | | | 4.0 | 4.0 | 4.0 | 4.0 | |
| | Yellow pigment(P.Y.155) | | | | | | | 4.0 |
| | Yellow pigment (P.Y.150) | | | | | | | |
| | Orange pigment(P.O.43) | | | | | | | |
| | Orange pigment(P.O.71) | | | | | | | |
| | Green pigment(P.G.35) | | | | | | | |
| | Green pigment(P.G.58) | | | | | | | |
| | Red pigment(P.R.254) | | | | | | | |
| Resin | Polyester-based polymeric dispersing agent | 1.5 | 1.5 | 2.0 | 2.0 | 2.0 | 2.0 | 2.0 |
| | Acrylic resin — Acrylic-based resin 1(0.0) | | | | 0.5 | | | |
| | Acrylic-based resin 2(0.0) | 4.5 | | 4.5 | | | | 4.5 |
| | Acrylic-based resin 3(0.1) | | | | | | | |
| | Acrylic-based resin 4(2.2) | | | | | | | |
| | Acrylic-based resin 5(8.1) | 1.5 | | 1.5 | | | | 1.5 |
| | Acrylic-based resin 6(10.7) | | 3.9 | | | | 3.9 | |
| | Vinyl chloride-vinyl acetate resin copolymer — Vinyl chloride-vinyl acetate copolymer resin1(0.3) | | | | | | | |
| | Vinyl chloride-vinyl acetate copolymer resin 2(1.4) | | | | | 5.6 | | |
| | Vinyl chloride-vinyl acetate copolymer resin 3(3.8) | | | | 4.5 | | | |
| | Vinyl chloride-vinyl acetate copolymer resin 4(8.2) | | | | | | | |

TABLE 4-continued

|  |  |  |  |  |  |  |  |  |  |
|---|---|---|---|---|---|---|---|---|---|
|  | Cellulose-based resin | Cellulose-based resin 1(4.9) |  |  |  |  |  |  |  |
|  |  | Cellulose-based resin 2(29.0) |  |  |  |  |  |  |  |
|  | Total resin content |  | 7.5 | 5.4 | 8.0 | 7.0 | 7.6 | 5.9 | 8.0 |
| Solvent |  |  |  |  |  | Balance |  |  |  |
| Total |  |  | 100.0 | 100.0 | 100.0 | 100.0 | 100.0 | 100.0 | 100.0 |
| Intrinsic viscosity(%) (With respect | 90 mL/g or more |  | 2.03 | 10.7 | 2.0 | 3.4 | 1.4 | 10.7 | 2.0 |
| to total amount of resin) | 100 mL/g or more |  | 1 | 5.7 | 1.4 | 1.3 | 0.5 | 5.7 | 1.4 |
| Evaluation | Ejection property | Ejection stability | ○ | X | ○ | ○ | ○ | X | ○ |
|  | Image quality | Solid filling | ○ | X | ○ | ○ | ○ | X | ○ |
|  | Liquid physical property | Intermittent ejection property | ○ | Δ | ○ | Δ | ○ | Δ | ○ |
|  | Coating film physical property | Coating film abrasion resistance | ○ | ○ | ○ | ○ | ○ | ○ | ○ |
|  | Quality | OD value (coloring) | ○ | X | ○ | ○ | ○ | X | ○ |
| Intrinsic viscosity(%) (With respect | 90 mL/g or more |  | 0.15 | 0.58 | 0.16 | 0.24 | 0.11 | 0.63 | 0.16 |
| to total amount of ink) | 100 mL/g or more |  | 0.11 | 0.31 | 0.11 | 0.09 | 0.04 | 0.34 | 0.11 |

|  |  |  | Comparative Example 10 | Example 22 | Example 23 | Example 24 | Example 25 | Example 26 | Example 27 |
|---|---|---|---|---|---|---|---|---|---|
| Pigment | Carbon black |  |  |  |  |  |  |  |  |
|  | Cyan pigment(P.B. 15:4) |  |  |  |  |  |  |  |  |
|  | Magenta pigment(P.R.122) |  |  |  |  |  |  |  |  |
|  | Yellow pigment(P.Y. 155) |  | 4.0 |  |  |  |  |  |  |
|  | Yellow pigment (P.Y. 150) |  |  | 4.0 |  |  |  |  |  |
|  | Orange pigment(P.O.43) |  |  |  | 3.0 |  |  |  |  |
|  | Orange pigment(P.O.71) |  |  |  |  | 3.0 |  |  |  |
|  | Green pigment(P.G.35) |  |  |  |  |  | 3.0 |  |  |
|  | Green pigment(P.G.58) |  |  |  |  |  |  | 3.0 |  |
|  | Red pigment(P.R.254) |  |  |  |  |  |  |  | 3.0 |
| Resin | Polyester-based polymeric dispersing agent |  | 2.0 | 2.0 | 1.5 | 1.5 | 1.5 | 1.5 | 1.5 |
|  | Acrylic resin | Acrylic-based resin 1(0.0) |  |  |  |  |  |  |  |
|  |  | Acrylic-based resin 2(0.0) |  | 4.5 | 4.5 | 4.5 | 4.5 | 4.5 | 4.5 |
|  |  | Acrylic-based resin 3(0.1) |  |  |  |  |  |  |  |
|  |  | Acrylic-based resin 4(2.2) |  |  |  |  |  |  |  |
|  |  | Acrylic-based resin 5(8.1) |  | 1.5 | 1.5 | 1.5 | 1.5 | 1.5 | 1.5 |
|  |  | Acrylic-based resin 6(10.7) | 3.9 |  |  |  |  |  |  |
|  | Vinyl chloride-vinyl acetate resin copolymer | Vinyl chloride-vinyl acetate copolymer resin1(0.3) |  |  |  |  |  |  |  |
|  |  | Vinyl chloride-vinyl acetate copolymer resin 2(1.4) |  |  |  |  |  |  |  |
|  |  | Vinyl chloride-vinyl acetate copolymer resin 3(3.8) |  |  |  |  |  |  |  |
|  |  | Vinyl chloride-vinyl acetate copolymer resin 4(8.2) |  |  |  |  |  |  |  |
|  | Cellulose-based resin | Cellulose-based resin 1(4.9) |  |  |  |  |  |  |  |
|  |  | Cellulose-based resin 2(29.0) |  |  |  |  |  |  |  |
|  | Total resin content |  | 5.9 | 8.0 | 7.5 | 7.5 | 7.5 | 7.5 | 7.5 |
| Solvent |  |  |  |  |  | Balance |  |  |  |
| Total |  |  | 100.0 | 100.0 | 100.0 | 100.0 | 100.0 | 100.0 | 100.0 |
| Intrinsic viscosity(%) (With respect | 90 mL/g or more |  | 10.7 | 2.0 | 2.0 | 2.0 | 2.0 | 2.0 | 2.0 |
| to total amount of resin) | 100 mL/g or more |  | 5.7 | 1.4 | 1.4 | 1.4 | 1.4 | 1.4 | 1.4 |
| Evaluation | Ejection property | Ejection stability | X | ○ | ○ | ○ | ○ | ○ | ○ |
|  | Image quality | Solid filling | X | ○ | ○ | ○ | ○ | ○ | ○ |
|  | Liquid physical property | Intermittent ejection property | Δ | ○ | ○ | ○ | ○ | ○ | ○ |
|  | Coating film physical property | Coating film abrasion resistance | ○ | ○ | ○ | ○ | ○ | ○ | ○ |
|  | Quality | OD value (coloring) | X | ○ | ○ | ○ | ○ | ○ | ○ |

TABLE 4-continued

| Intrinsic viscosity(%) (With respect to total amount of ink) | 90 mL/g or more | 0.63 | 0.16 | 0.15 | 0.15 | 0.15 | 0.15 | 0.15 |
|---|---|---|---|---|---|---|---|---|
| | 100 mL/g or more | 0.34 | 0.11 | 0.11 | 0.11 | 0.11 | 0.11 | 0.11 |

| | | | Example 28 | Example 29 | Example 30 | Comparative Example 11 | Example 31 | Example 32 | Example 33 |
|---|---|---|---|---|---|---|---|---|---|
| Pigment | Carbon black | | 4.0 | 4.0 | 4.0 | 4.0 | | | |
| | Cyan pigment(P.B. 15:4) | | | | | | 3.0 | 4.0 | |
| | Magenta pigment(P.R.122) | | | | | | | | 4.0 |
| | Yellow pigment(P.Y. 155) | | | | | | | | |
| | Yellow pigment (P.Y. 150) | | | | | | | | |
| | Orange pigment(P.O.43) | | | | | | | | |
| | Orange pigment(P.O.71) | | | | | | | | |
| | Green pigment(P.G.35) | | | | | | | | |
| | Green pigment(P.G.58) | | | | | | | | |
| | Red pigment(P.R.254) | | | | | | | | |
| Resin | Polyester-based polymeric dispersing agent | | 2.0 | 2.0 | 2.0 | 2.0 | 1.5 | 2.0 | 2.0 |
| | Acrylic resin | Acrylic-based resin 1(0.0) | | 0.5 | | | | | |
| | | Acrylic-based resin 2(0.0) | 4.5 | | | | 4.5 | 4.5 | 4.5 |
| | | Acrylic-based resin 3(0.1) | | | | | | | |
| | | Acrylic-based resin 4(2.2) | | | | | | | |
| | | Acrylic-based resin 5(8.1) | 1.5 | | | | 1.5 | 1.5 | 1.5 |
| | | Acrylic-based resin 6(10.7) | | | | 3.9 | | | |
| | Vinyl chloride-vinyl acetate resin copolymer | Vinyl chloride-vinyl acetate copolymer resin1(0.3) | | | | | | | |
| | | Vinyl chloride-vinyl acetate copolymer resin 2(1.4) | | | 5.6 | | | | |
| | | Vinyl chloride-vinyl acetate copolymer resin 3(3.8) | | 4.5 | | | | | |
| | | Vinyl chloride-vinyl acetate copolymer resin 4(8.2) | | | | | | | |
| | Cellulose-based resin | Cellulose-based resin 1(4.9) | | | | | | | |
| | | Cellulose-based resin 2(29.0) | | | | | | | |
| | Total resin content | | 8.0 | 7.0 | 7.6 | 5.9 | 7.5 | 8.0 | 8.0 |
| Solvent | | | Balance | | | | | | |
| Total | | | 100.0 | 100.0 | 100.0 | 100.0 | 100.0 | 100.0 | 100.0 |
| Intrinsic viscosity(%) (With respect to total amount of resin) | 90 mL/g or more | | 2.0 | 3.4 | 1.4 | 10.7 | 2.0 | 2.0 | 2.0 |
| | 100 mL/g or more | | 1.4 | 1.3 | 0.5 | 5.7 | 1.4 | 1.4 | 1.4 |
| Evaluation | Ejection property | Ejection stability | ○ | ○ | ○ | X | ○ | ○ | ○ |
| | Image quality | Solid filling | ○ | ○ | ○ | X | ○ | ○ | ○ |
| | Liquid physical property | Intermittent ejection property | ○ | Δ | ○ | Δ | ○ | ○ | ○ |
| | Coating film physical property | Coating film abrasion resistance | ○ | ○ | ○ | ○ | ○ | ○ | ○ |
| | Quality | OD value (coloring) | ○ | ○ | ○ | X | ○ | ○ | ○ |
| Intrinsic viscosity(%) (With respect to total amount of ink) | 90 mL/g or more | | 0.16 | 0.24 | 0.11 | 0.63 | 0.15 | 0.16 | 0.16 |
| | 100 mL/g or more | | 0.11 | 0.09 | 0.04 | 0.34 | 0.11 | 0.11 | 0.11 |

From Table 4, it is shown that even non-aqueous ink compositions of Examples 17 to 27 in which types of the contained pigments are changed have, similarly, excellent printing performance such as continuous ejection stability, and having good storage stability, and with which printed matter having good coloring property and excellent durability can be obtained.

Furthermore, it is shown that even non-aqueous ink compositions of Examples 28 to 33 in which the contained organic solvent is changed to a mixed solvent (a solvent including a glycol ether solvent and an amide solvent) including 80% by mass of diethylene glycol diethyl ether, 10 masses of methyl ethyl diglycol, and 10% by mass of methyl 3-methoxy-N,N-dimethyl propane amide have, similarly, excellent printing performance such as continuous ejection stability, and having good storage stability, and with which printed matter having good coloring property and excellent durability can be obtained.

The invention claimed is:

1. A non-aqueous ink composition comprising an organic solvent, a coloring material, and a resin, and being ejected by an inkjet method, the resin containing at least one or more resins selected from the group consisting of an acrylic-based resin, a vinyl chloride-vinyl acetate copolymer resin, and a cellulose-based resin, and, the resin comprising a resin having an intrinsic viscosity at 25° ° C. of 90 mL/g or more in a content of 5% by mass or less with respect to a total amount of the resin, wherein the intrinsic viscosity of the resin is obtained by dispersing the resin in a developing solvent, subjecting the obtained resin dispersion to gel permeation chromatography using a column filled with a granular gel to separate molecules included in the resin according to molecular weight, determining a specific viscosity $[\eta_{SP}]$ $((\eta-\eta_0)/\eta_0$ ($\eta_0$: solvent viscosity, $\eta$: solution viscosity)) and concentration C, and extrapolating the concentration C to 0 (C→0) in formula Lim ($[\eta_{SP}]$/C).

2. The non-aqueous ink composition according to claim 1, wherein the resin comprised in the non-aqueous ink composition is comprised in a content of 3.0% by mass or more and 13.0% by mass or less with respect to a total amount of the non-aqueous ink composition.

3. The non-aqueous ink composition according to claim 1, wherein the resin comprises a polymeric dispersing agent.

4. The non-aqueous ink composition according to claim 1, wherein the organic solvent comprises at least one or more solvents selected from the group consisting of a glycol ether-based solvent, an amide-based solvent, a lactone-based solvent, and a carbonate-based solvent.

5. An inkjet recording method comprising ejecting the non-aqueous ink composition according to claim 1 to a surface of a medium by an inkjet method.

6. A method for manufacturing printed matter, the method comprising ejecting the non-aqueous ink composition according to claim 1 to a surface of a medium by an inkjet method.

7. The non-aqueous ink composition according to claim 2, wherein the resin comprises a polymeric dispersing agent.

8. The non-aqueous ink composition according to claim 2, wherein the organic solvent comprises at least one or more solvents selected from the group consisting of a glycol ether-based solvent, an amide-based solvent, a lactone-based solvent, and a carbonate-based solvent.

9. An inkjet recording method comprising ejecting the non-aqueous ink composition according to claim 2 to a surface of a medium by an inkjet method.

10. A method for manufacturing printed matter, the method comprising ejecting the non-aqueous ink composition according to claim 2 to a surface of a medium by an inkjet method.

11. The non-aqueous ink composition according to claim 3, wherein the organic solvent comprises at least one or more solvents selected from the group consisting of a glycol ether-based solvent, an amide-based solvent, a lactone-based solvent, and a carbonate-based solvent.

12. An inkjet recording method comprising ejecting the non-aqueous ink composition according to claim 3 to a surface of a medium by an inkjet method.

13. A method for manufacturing printed matter, the method comprising ejecting the non-aqueous ink composition according to claim 3 to a surface of a medium by an inkjet method.

14. An inkjet recording method comprising ejecting the non-aqueous ink composition according to claim 4 to a surface of a medium by an inkjet method.

15. A method for manufacturing printed matter, the method comprising ejecting the non-aqueous ink composition according to claim 4 to a surface of a medium by an inkjet method.

* * * * *